United States Patent [19]
Parise et al.

[11] Patent Number: 5,481,750
[45] Date of Patent: Jan. 2, 1996

[54] PROCESS FOR ALLOCATING ADDRESSES TO NEWLY CONNECTED APPARATUS IN A DOMESTIC NETWORK CONTROLLED BY A MASTER CONTROLLER

[75] Inventors: Vital A. Parise, Douvres-La Delivrance; Joseph A. P. M. Letorey, Varaville; Patrick M. G. Leveque, Saint-Lo, all of France

[73] Assignee: Moulinex (Societe Anonyme), Bagnolet, France

[21] Appl. No.: 299,651

[22] Filed: Sep. 1, 1994

Related U.S. Application Data

[63] Continuation of Ser. No. 819,131, Jan. 10, 1992, abandoned.

[30] Foreign Application Priority Data

Jan. 17, 1991 [FR] France ................... 91 00479

[51] Int. Cl.$^6$ ..................................... G06F 13/14
[52] U.S. Cl. ................ 395/800; 364/132; 364/188; 370/93
[58] Field of Search ................... 364/132, 188; 395/280, 800; 370/93

[56] References Cited

U.S. PATENT DOCUMENTS

| | | | |
|---|---|---|---|
| 4,217,646 | 8/1980 | Caltagirone et al. | 364/493 |
| 4,354,262 | 10/1982 | Guézou et al. | 370/58.2 |
| 4,445,176 | 4/1984 | Burk et al. | 395/200 |
| 4,476,527 | 10/1984 | Clayton, Jr. | 395/275 |
| 4,689,786 | 8/1987 | Sidhu et al. | 370/85.1 |
| 4,773,005 | 9/1988 | Sullivan | 395/275 |
| 4,803,613 | 2/1989 | Kametani et al. | 364/132 |
| 4,805,085 | 2/1989 | Mogi et al. | 364/132 |
| 4,807,109 | 2/1989 | Farrell et al. | 395/325 |
| 4,814,984 | 3/1989 | Thompson | 395/200 |
| 4,882,674 | 11/1989 | Quint et al. | 395/700 |
| 5,072,374 | 12/1991 | Sexton et al. | 395/800 |

(List continued on next page.)

FOREIGN PATENT DOCUMENTS

| | | |
|---|---|---|
| 0320390 | 6/1989 | European Pat. Off. . |
| 0367692 | 5/1990 | European Pat. Off. . |
| 0378018 | 7/1990 | European Pat. Off. . |
| 0466151 | 1/1992 | European Pat. Off. . |

OTHER PUBLICATIONS

Middle East Electricity; "Home, Smart Home" Mar. 1988, vol. 12 No. 3, pp. 16–17 & 20.

Hunt et al; "Electrical Energy Monitoring and Control Systems for the Home"; IEEE Transactions on Consumer Electronics, vol. CE–32; No. 3, Aug. 1986, pp. 578–583.

Kishimoto et al., "Configuration and Performance of a Home Bus Using Slotted Flag Control"; IEEE Trans. On Consumer Electronics, vol. CE–32, No. 3, Aug. 1986, pp. 584–592.

Stauffer; "Smart Enabling System for Home Automation" IEEE Trans. On Consumer Electronics, vol. 37, No. 2, May 1991, pp. XXIX–XXXV.

*Primary Examiner*—Krisna Lim
*Attorney, Agent, or Firm*—Young & Thompson

[57] ABSTRACT

The process uses the technique of carrier currents between the emitter-receivers (2, 3 . .) called slaves comprising each a microcontroller (4, 5 . .), and a master controller (6) comprising a microcontroller (7) whose memory contains addresses relating to the slaves and to the dwelling. According to the invention, during connection of a slave to the network there is activated the master controller (6) by typing a number on the programming keyboard of the master controller (6), one pushes a pushbutton (13) so as to trigger a subprogram (14) for production of a message (M1) containing the following information: general distribution; request for address allocation; slave address, there is sent (15) the message. One awaits (16) a second message (M2) from the master controller, then during reception of the second message M2, the applicant slave sends to the master controller (6) an acknowledgement AS comprising information on the allocation of the slave, this information being transmitted to the user by means of a display.

5 Claims, 4 Drawing Sheets

U.S. PATENT DOCUMENTS

| | | | |
|---|---|---|---|
| 5,128,855 | 7/1992 | Hilber et al. | 364/132 |
| 5,136,496 | 8/1992 | Tsuboi | 364/132 |
| 5,148,389 | 9/1992 | Hughes | 395/800 |
| 5,150,464 | 9/1992 | Sidhu et al. | 395/200 |
| 5,210,530 | 5/1993 | Kammerer et al. | 340/825.08 |
| 5,237,676 | 8/1993 | Arimilli et al. | 395/550 |
| 5,243,700 | 9/1993 | Larsen et al. | 395/275 |

PROCESS FOR ALLOCATING ADDRESSES TO NEWLY CONNECTED APPARATUS IN A DOMESTIC NETWORK CONTROLLED BY A MASTER CONTROLLER

This application is a continuation of application Ser. No. 07/819,131, filed Jan. 10, 1992, now abandoned.

FIELD OF THE INVENTION

The present invention relates to a process for the allocation of addresses in a network for the distribution of electrical energy in a dwelling. For this purpose there is used the technique of carrier currents for the transmission of information between emitter-receivers called slaves. Each plane comprises a microcontroller, and an EEPROM memory adapted to contain various addresses relating particularly to the slave and to the dwelling. At least one master controller comprises on the one hand a microcontroller for information processing which is connected to a programming keyboard and which contains in its memory user programs and various addresses relating particularly to the slaves and to the dwelling and, on the other hand, a display unit DU permitting the display of the number of the slave.

Known processes for the allocation of addresses are complicated, not always reliable, and do not permit the user to control completely the sequence of the procedure to obtain optimum safety conditions.

The invention has for its object to overcome these disadvantages.

SUMMARY OF THE INVENTION

According to the invention, the process is characterized by the fact that during connection of a slave to the network, there is initiated the allocation procedure for the addresses by activating the master controller by typing in a number selected for the slave on the programming keyboard which, on the one hand, sets the master controller to receive a signal and, on the other hand, triggers simultaneously the running of a timer at the end of which, if no signal has been entered, the master controller is deactivated returning to its normal operation. There is actuated an actuation means of a slave which triggers the formation, by a first subprogram, of a first message containing at least one request for the allocation of addresses. This first message is sent out on the network, the response of the master controller is awaited to the receipt of said first message, then the master controller transmits to the slave a second message comprising particularly the number of the selected slave, then said slave, after reception of said second message, sends out an acknowledgement of reception which is displayed on the display unit and comprises information on the allocation of the slave to the master controller.

Thanks to this process, it will be understood that, to address a slave in the network, the user places the master controller in a waiting mode and acts on a pushbutton of the slave, thereby automatically triggering a sequence culminating in the transmission of the address allocation message toward the slave which processes it and which will permit, thanks to a display unit, to monitor the allocation of the slaves in the distribution network of the electrical energy of a dwelling.

BRIEF DESCRIPTION OF THE DRAWINGS

The characteristics and advantages of the invention will become more apparent from the description which follows, by way of example, with reference to the accompanying drawings, in which.

DESCRIPTION OF THE PREFERRED EMBODIMENTS

To permit better understanding of certain expressions used in the present application, there are given hereafter several definitions:

slave: emitter-receiver, connected to the network;

dwelling: a special area comprising a network allocated to a user, for example a house, factory, apartment;

family: group of apparatus having the same name, for example, radiators, lamps;

zone: a portion of a dwelling.

Figure 1:
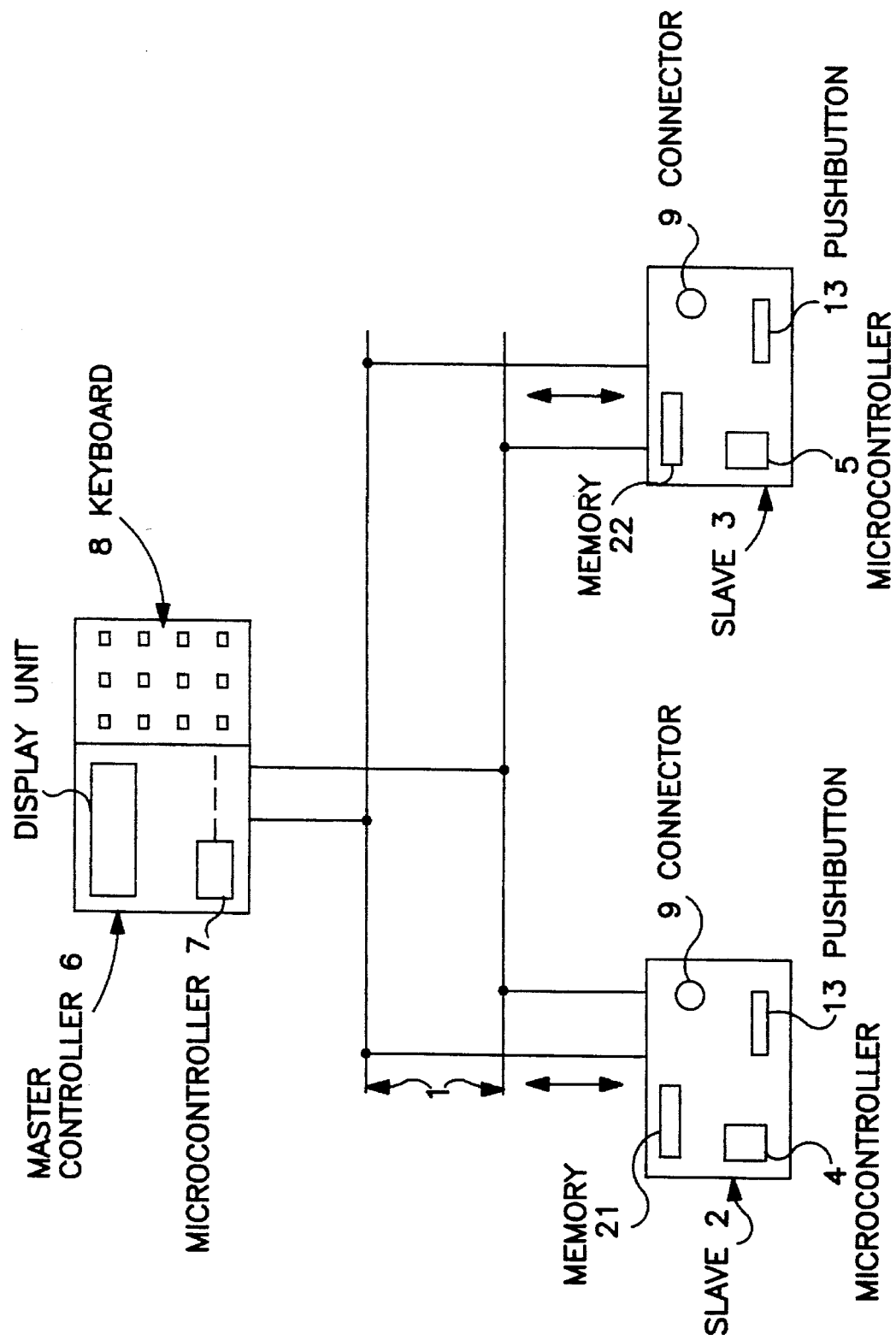
FIG. 1 is a simplified schematic view showing the connection of slave receivers and a master controller in a network to which is applied the process of allocation of addresses according to the invention.

As is schematically shown in FIG. 1, the network 1 for the distribution of electrical energy in a dwelling is provided with emitter-receivers 2, 3 . . . called slaves comprising each a microcontroller 4, 5 . . . , an EEPROM memory 21, 22 adapted to contain various addresses relating particularly to the slave, to the dwelling, to the zone, to the family and to the master controller, a connection 9 for user apparatus (not shown) which itself is associated, for example, with an electric household appliance such as a coffeemaker, a shutter with an electric motor or a bed lamp, and actuation means 13 for the slave. This actuation means 13 is for example a pushbutton which, when it is activated triggers a subprogram 14 for the composition of a message M1. To the network is also connected a master controller 6 comprising a microcontroller 7 for information processing, a protected RAM memory (not shown) which contains user programs, a programming keyboard 8 connected to the microcontroller permitting acting on the sequence of the allocation program and display unit DU permitting the display of the number of the slave to which attribution is made by the master controller during triggering of the allocation procedure.

The microcontrollers utilized are, for example, of the type 80C51 made, for example, by INTEL Corporation.

To exchange information between the slaves 2, 3 . . . and the master register 6, there is used the well-known technique of carrier currents which consist in modulating a high frequency carrier signal by the information to be transmitted, in emitting on the distribution network 1 which, in France, has a voltage of 220 volts and a frequency of 50 hertz, then in demodulating the carrier signal to recover the information to further process it.

According to the invention, to permit communication without identification error between the slaves 2, 3 . . . and the master controller 6, there is used the following process for allocation of addresses.

Figure 2:
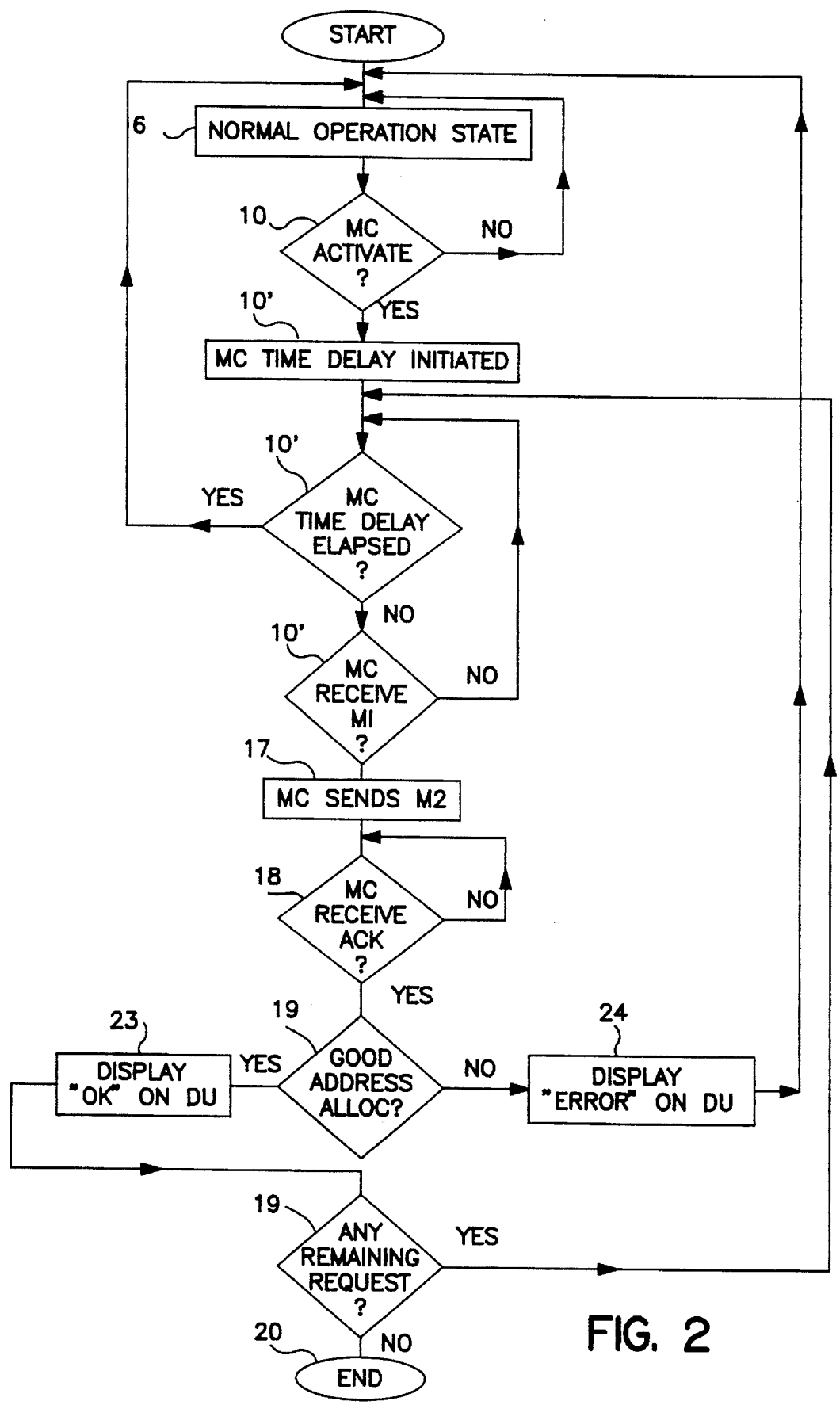
FIGS. 2 and 3 are flow diagrams of the operative steps of the process according to the invention.
Figure 3:
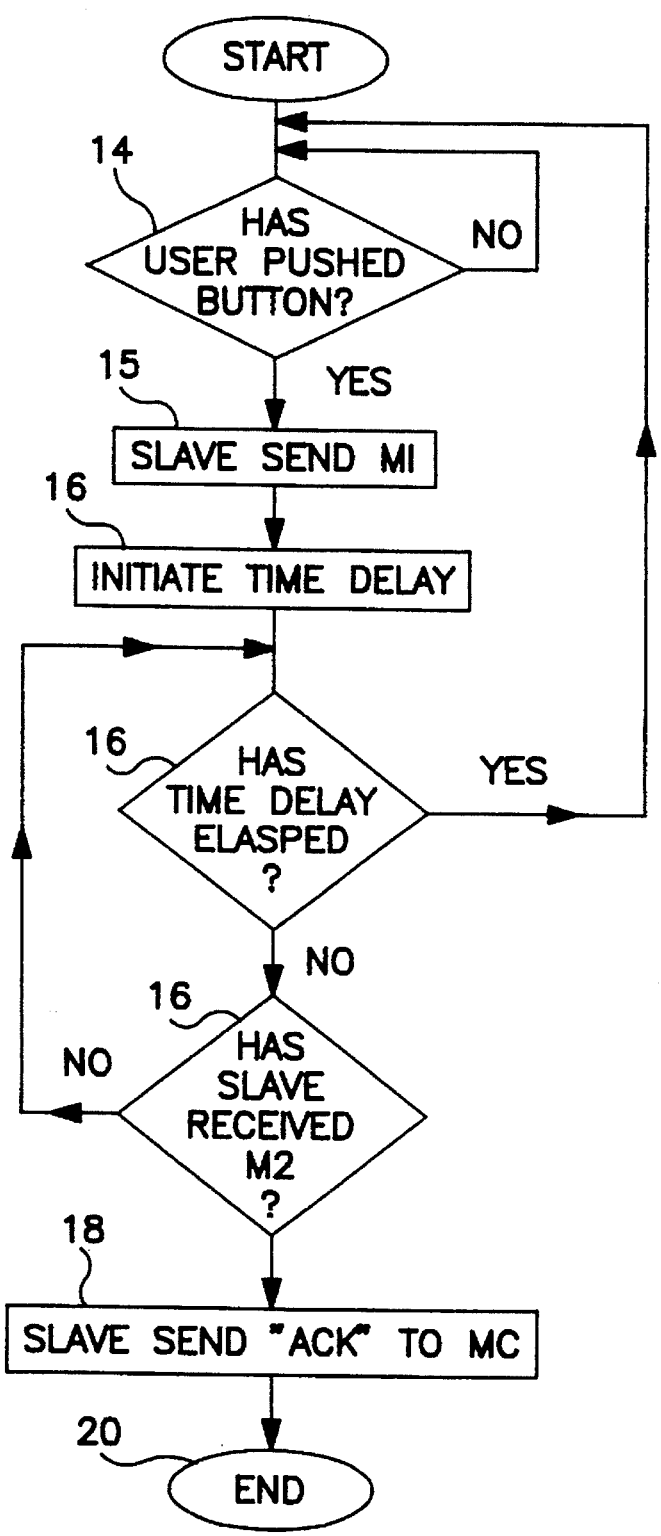
Figure 4:
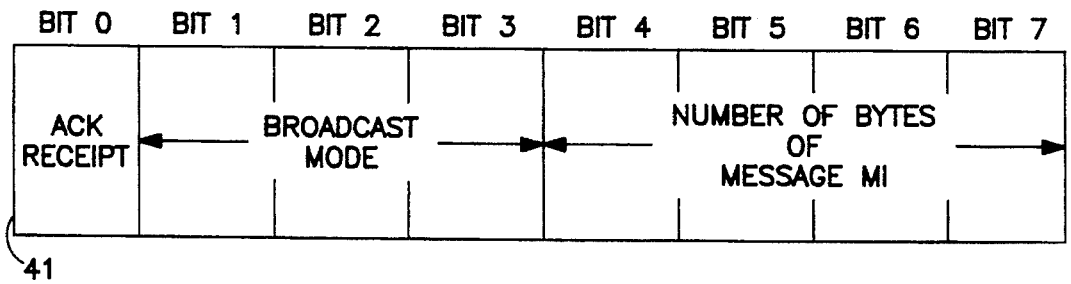
FIG. 4 shows the bit-by-bit structure of the three mandatory bytes of messages M1 and M2.
Figure 4:
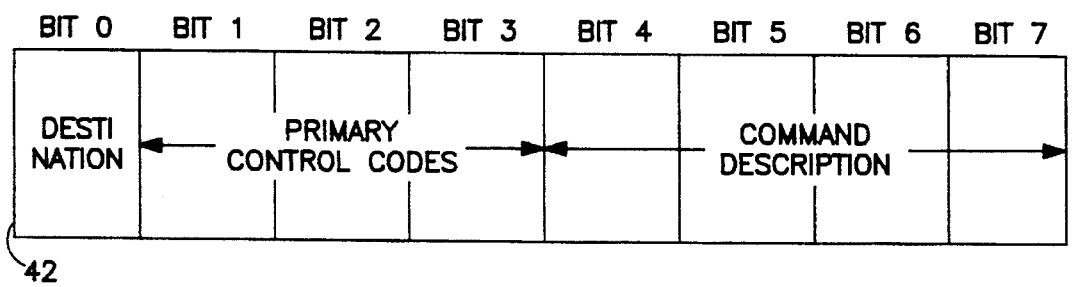
Figure 4:
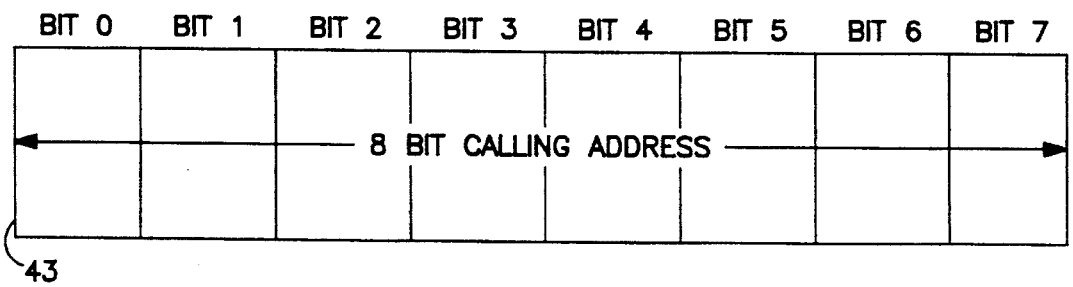

For the slaves and the master controller, after connection of a slave into the network, and as shown in FIGS. 2 (flow diagram for the operation of master controller) and 3 (flow diagram for the slave), there is instituted at 10 the procedure for allocation of addresses by activating the master controller 6 which assumes the "waiting" mode, for example by typing in a numeral on the keyboard 8. This numeral is for example the numeral which is to be attributed to the slave which is connected to the network. At 10' is simultaneously triggered a time delay at the end of which, if no message M1 has been received by the master controller, this latter is deactivated and repositioned to normal operation. The message M1 emanates generally from a slave which is asking, by a triggering of the pushbutton 13 on said slave, for allocation of an address.

The first message M1 comprises for example three mandatory bytes and between 0 and 13 optional bytes for data. The three mandatory bytes are defined in the following manner:

the first byte 41 is constituted by a bit corresponding to whether receipt is acknowledged or not, of three bits defining the broadcast mode (zone(s), family(s), general . . . ) and of four bits indicating the number of bytes of the message M1.

the second byte 42 is constituted by a bit indicating the type of the destination (master controller(s), apparatus(s)), of three bits defining the primary control codes (stop, start, numeral code, condition, time . . . ) and of four bits for command description.

the third byte 43 is constituted of eight bits giving the calling address.

The optional bytes defined according to the control mode contain, for example, the house number, the family number, the zone number, the address called, the number of the master controller.

The first message M1, during the first request for address allocation contains only few of the elements defined above. To trigger 14, the message M1, one pushes on the pushbutton 13 of the slave (2, 3 . . . ). One sends at 15 said first message M1 into the network, one awaits at 16 a response to the first message M1 from the master controller in "waiting" mode; this response indicated at 17, is the transmission of a second message M2 by means for example of touching an activator 1. The second message M2 comprises the same elements as the first message M1. During the first request for address allocation, this message M2 transmits, to the slave, all the information necessary for its addressing in the network. Upon reception of the message M2, the slave 2, 3 . . . sends at 18 an acknowledgment referred ACK to the master controller. This acknowledgement with reference ACK comprises information determining the good allocation or not, by the slave, of its request and ends at 20 the transmission.

Said information when it is received at 19 is, for example, visible on the display unit DU of the master controller. It contains, for example, either the message "OK" 23 or the message "ERROR" 24. The message "OK" corresponds, for example, to good transmission of the information contained in the second message M2; these latter, in this case, are memorized in a memory of the slave. The message "ERROR" means, for example, either a poor transmission of the information of the second message, or an allocation by another master controller disposed in the network of said slave. When this message "ERROR" appears, it is thus necessary to start the address allocation procedure over to obtain the display of the message "OK" on the master controller, which message corresponds to a perfect sequence of the address allocation procedure and which ends at 20 the allocation request.

In another embodiment, to inform the user of good or bad address allocation procedure, it is possible to use, for example, an audible indicator which, for example, during a good allocation procedure, emits no audible signal and which, during a defective allocation procedure, triggers a sound signal.

Any indicator adapted to inform the user can be used provided that it does not exceed the size limitations of the dimensions of the master controller.

As can be seen, the master controller has two types of operation: a normal operation and an active operation. The user triggers the active operation of the master controller which, on the one hand, completely controls the allocation procedure of a slave to the network, and, on the other hand, the programming and verification procedures of operation of the assembly of the system thus arranged. When no action is performed by the user, the master controller is in its normal operation position, which is to say that there is a display on the display unit DU of the master controller of the time given by an internal clock (not shown).

What is claimed is:

1. Process for the allocation of addresses in a domestic network for the distribution of electrical energy in a dwelling, said domestic network using carrier currents for a transmission of information between emitter-receivers (2, 3) called slaves which are connected by a socket (9) to said domestic network, each of said slaves comprising a microcontroller (4, 5) and an EEPROM memory adapted to contain the addresses relative to the slave and to the dwelling and at least one master controller (MC) (6) comprising a display unit (DU) and a microcontroller (7) for information processing which is connected to a programming keyboard (8), said master controller comprising memory storing user programs and the address allocated to each slave located in said dwelling, said process comprising the steps of:

a) a user activating the master controller (MC) by typing on the keyboard (8) a numeral corresponding to said address to be allocated and for indicating to said master controller (MC) that a new slave is connected to said domestic network and requests the allocation of an address;

b) awaiting a first message M1 from the slave and starting simultaneously a time-delay at the end of which the master controller (MC) is automatically deactivated if it receives no message from the slave newly connected;

c) said user actuating a pushbutton (13) on the said newly connected slave which triggers a production by a program (14) of said first message (M1) for requesting the allocation of an address;

d) sending said first message (M1) onto said domestic network to the master controller (MC);

e) delaying the transmission of an acknowledgment signal (ACK) from said slave until said slave receives a second message (M2) transmitted by the master controller (MC);

f) transmitting a second message (M2) to the slave, by the master controller (MC) upon receiving a message (M1), said message (M2) comprising said numeral corresponding to said address allocated by said user of the slave; and g) storing, in said EEPROM memory of said slave, said allocated address contained in said message (M2), said allocated address thus becoming the address of said slave on said domestic network;

h) transmitting, through said domestic network, by said slave upon receipt of the message (M2), the acknowledgment signal (ACK) to the master controller (MC).

2. Process for the allocation of addresses in a domestic network according to claim 1, in which there are used programs included in the EEPROM of the master controller (MC) and in each slave's EEPROM, said programs being adapted to be executed for generating messages.

3. Process for the allocation of addresses in a domestic network according to claim 1, wherein the message (M1) comprises the following three principal bytes:

a first byte comprising:
- a first bit used to acknowledge a receipt of a message,
- next three bits defining a diffusion mode, and
- last four bits indicating a length of the message (M1), a second byte comprising:
- a first bit indicating a type of device to which the message (M1) must be sent,
- three bits defining primary control codes, and
- last four bits representing data which will be used for programming the master controller (MC), and a third byte comprising
- eight bits which are used to address devices connected to said domestic network through said slaves.

4. Process for the allocation of addresses in a domestic network according to claim 3, wherein the message (M2) is structured identically as (M1).

5. Process for the allocation of addresses in a domestic network according to claim 4, wherein both the message (M1) and the message (M2) comprise optional bytes used according to a control mode to define:

a house number, a family number, zone number, an address called, and a master controller's number.

* * * * *